United States Patent [19]

Odler

[11] Patent Number: 5,356,472
[45] Date of Patent: Oct. 18, 1994

[54] PORTLAND CEMENT CLINKER AND PORTLAND CEMENT

[76] Inventor: Ivan Odler, Lärchenweg 23, D-3360 Goslar, Fed. Rep. of Germany

[21] Appl. No.: 16,966

[22] Filed: Feb. 12, 1993

[30] Foreign Application Priority Data

Feb. 13, 1992 [DE] Fed. Rep. of Germany ....... 4204227

[51] Int. Cl.$^5$ .............................................. C04B 7/04
[52] U.S. Cl. .................... 106/734; 106/735; 106/736; 106/739; 106/763; 106/765; 106/766; 106/768; 106/772; 106/775
[58] Field of Search ............. 106/739, 766, 768, 735, 106/765, 772, 775, 736, 763, 734

[56] References Cited

U.S. PATENT DOCUMENTS

| | | | |
|---|---|---|---|
| 3,589,920 | 6/1971 | Ostberg et al. | 106/739 |
| 3,864,138 | 2/1975 | Uchikawa et al. | 106/734 |
| 3,867,163 | 2/1975 | Uchikawa et al. | 106/823 |
| 4,316,583 | 2/1982 | Kawano et al. | 106/739 |
| 4,619,702 | 10/1986 | Gartner | 106/739 |
| 4,990,190 | 2/1991 | Myers et al. | 106/724 |
| 5,049,198 | 9/1991 | Ribas | 106/739 |

FOREIGN PATENT DOCUMENTS

| | | | |
|---|---|---|---|
| 46-002985 | 1/1971 | Japan | 106/739 |
| 1489947 | 10/1977 | United Kingdom | 106/802 |

OTHER PUBLICATIONS

1993 Annual Book of ASTM Standards, Vol. 0401 Cement; Lime; Gypsum (1993).
9th Internation Congress on the Chemistry of Cement New Delhi, India, (1992) pp. 3–7, 16, 20–20, 28 and 266.

*Primary Examiner*—Anthony Green
*Attorney, Agent, or Firm*—John F. A. Earley; John F. A. Earley, III

[57] ABSTRACT

The present invention pertains to a portland cement clinker containing the following amounts of clinker phases, in wt. %:

$C_3S$: 30 to 80,
$C_4A_3\bar{S}$: 5 to 30,
$C_4AF$: <30,
$C_2S$: <40,
$C_3A$: <20, and an $SO_3$ content between 2 and 8 wt. %, obtained by calcining a raw material mixture containing CaO, $SIO_2$, $AL_2O_3$, and $Fe_2O_3$ in the presence of an additive containing $SO_3$ and an additive containing fluorine at temperatures between 1,150° C. and 1,350° C.

14 Claims, No Drawings

PORTLAND CEMENT CLINKER AND PORTLAND CEMENT

The present invention pertains to a portland cement as well as to the clinker thereof. Portland cement usually consists of portland cement clinker and a sulfate carrier, usually gypsum.

Portland cement clinker is prepared from a raw material mixture that contains mainly defined percentages of calcium oxide (CaO), silicon dioxide ($SiO_2$), alumina ($Al_2O_3$), and iron oxide ($Fe_2O_3$). By heating this mixture to sintering, new compounds, the so-called clinker phases, are formed from it. Their typical proportions in weight percent can be described as follows:

$C_3S$ (3 CaO × $SiO_2$) 40 to 80,
$C_2S$ (2 CaO × $SiO_2$) < 30,
$C_4AF$ (4 CaO × $Al_2O_3$ × $Fe_2O_3$) 4 to 15, and
$C_3A$ (3 CaO × $Al_2O_3$) 7 to 15.

The cement, mixed with water and hardened, owes its strength above all to the clinker phase $C_3S$.

The preparation of the cement clinker requires a considerable amount of energy. This energy consists in part of heat losses during calcining (especially due to radiation, waste gas losses, and the hot clinker discharged at the end of the kiln). Another portion of energy is consumed for endothermic reactions, especially during the decomposition of calcium carbonate (the essential CaO carrier) into calcium oxide.

Correspondingly, attempts have been made to reduce the energy costs.

It first appeared logical to try to accomplish this goal most simply by reducing the amount of clinker phases rich in CaO ($C_3A$, $C_3S$) and to correspondingly increase the amount of the phases with lower CaO content ($C_2S$, $C_4AF$).

However, the drawback would be that the increase in the strength of the corresponding cement would lag far behind that of usual portland cements, because the hydration of $C_2S$ and $C_4AF$ takes place much more slowly than that of $C_3S$ and $C_3A$.

Attempts have been made in this connection to replace the clinker phase $C_3S$ with $C_4A_3\bar{S}$ (in which $\bar{S}$ stands for $SO_3$), because $C_4A_3\bar{S}$ undergoes hydration relatively rapidly. Separate addition of a sulfate carrier to the raw material mixture is necessary in this case, and the largest portion of the sulfate (expressed as $SO_3$) is bound in the phase $C_4A_3\bar{S}$.

One drawback of this prior-art cement (clinker) is that no $C_3S$ is formed during the calcining process at all, because the formation of $C_3S$ is hindered or prevented by the presence of the sulfates ($SO_3$). In addition, no $C_3S$ is formed at the lower calcining temperatures of about 1,250°–1,300° C., which are necessary for the formation of $C_4A_3\bar{S}$. However, it is impossible to increase the temperature, because $C_4A_3\bar{S}$ would again become unstable and it would no longer be able to be formed.

Therefore, the basic task of the present invention is to provide a portland cement, whose clinker can be prepared at lower calcining temperatures than in the case of a conventional portland cement, but the clinker will have the highest possible $C_3S$ content, so that the portland cement formed from it (after separate addition of sulfate) will show, after mixing with water, an increase in strength that is at least equivalent to that of a conventional portland cement.

It was surprisingly observed that a portland cement clinker with a $C_3S$ content between 30 and 80 wt. %, in which the clinker phase $C_4A_3\bar{S}$ is also present, can be prepared without any problem, and requires even lower calcining temperatures, between 1,150° C. and 1,350° C., if it is ensured that an additive containing $SO_3$ and another additive containing fluorine ($F^-$) are added to the raw material mixture, wherein the $SO_3$ content in the clinker should be between 2 and 8 wt. %.

The reasons for this are still unknown. However, in the presence of components containing $SO_3$ and fluorine, the formation of the clinker phase from conventional raw materials is obviously based on a synergistic interaction of the individual components, such that the formation of the clinker phase $C_3S$ becomes possible in a sulfur-containing medium, and this takes place at even markedly lower temperatures than has been known to date, and thus it does not adversely affect the formation of the other clinker phase $C_4A_3\bar{S}$.

Catalytic effect is exerted on the formation of $C_3S$ mainly by the component containing fluoride ions, which is preferably introduced as calcium fluoride or sodium fluoride.

The following advantages arise at the same time as well:

The energy consumption during clinker production decreases due to the lower calcining temperature.

The calcium carbonate content in the raw meal can be reduced due to the considerable percentage of clinker phases with lower CaO content (especially $C_4A_3\bar{S}$). The chemical heat needed for the endothermic decomposition reaction also decreases correspondingly.

In addition, part of the calcium oxides necessary for the clinker phase formation is now introduced by the sulfate carrier, e.g., anhydrite ($CaSO_4$), rather than by calcium carbonate.

Further savings are obtained due to the fact that less cement clinker is needed per ton of portland cement than before. This because the needed amount of calcium sulfate added must be larger in a portland cement according to the present invention than in a conventional portland cement (the percentage of clinker decreases correspondingly), because the clinker phase $C_4A_3\bar{S}$ reacts while forming so-called ettringite, consuming more sulfate in the process.

A portland cement prepared from the clinker described by adding more sulfate exhibits an excellent increase in strength, especially during the time interval of the first twenty-eight days. Reference is made specifically to the exemplary embodiments that follow.

The total $SO_3$ content in the cement shall be between 3 and 18 wt. %.

A portland cement clinker may contain the following amounts of clinker phases in wt. %:

$3CaO.SiO_2$ ($C_3S$): 30 to 80,
$4CaO.3\,Al_2O_3.SO_3$ ($C_4A_3\bar{S}$): 5 to 30,
$4CaO.Al_2O_3.Fe_2O_3$ ($C_4AF$): <30,
$2CaO.SiO_2$ ($C_2S$): <40,
$3CaO.Al_2O_3$ ($C_2A$): <20, and an $SO_3$ content between 2 and 8 wt. %. The clinker is obtained by calcining a raw material mixture containing CaO, $SiO_2$, $Al_2O_3$, and $Fe_2O_3$ in the presence of an additive containing $SO_3$ and an additive containing fluorine ($F^{13}$) at temperatures between 1,150° C. and 1,350° C.

A cement clinker with the following weight percents of clinker phases is preferable:

$C_3S$: 40 to 80, $C_4A_3\bar{S}$: 10 to 30,
$C_4AF$: 10 to 30,
remainder, if any, $C_2S$ and $C_3A$.

The calcining of the clinker can be controlled such that practically no $C_2S$ and/or $C_3A$ will be formed. The sum of the amounts of the clinker phases $C_2S$ and $C_3A$ may be less than 5 wt. %.

The clinker phase formation described is facilitated by the percentage of fluorine ($F^{13}$) being 0.2 to 1.0 wt. % relative to the raw material mixture. The preferred range is between 0.4 and 0.6 wt. %.

A preferred $SO_3$ content in the clinker can be indicated as 4 to 6 wt. % relative to the raw material mixture.

The $SO_3$-containing component needed is preferably introduced in the form of a calcium sulfate. This may consist of gypsum or anhydrite. However, it is also possible to use sulfite- and/or sulfate-containing industrial residuals, e.g., an ash from a fluidized-bed furnace and/or a stabilizate from flue gas desulfurization.

The corresponding calcium sulfate may also be used to prepare the finished portland cement.

To optimize the setting reaction, it is suggested, according to an advantageous embodiment, that the clinker be ground to a specific surface of 2,500–4,000 $cm^2/g$ (according to Blaine).

that the grinding costs can also be reduced at equal specific surface.

Harmful emissions, e.g., $NO_x$ emissions, are also reduced as a result of the lower calcining temperatures.

The present invention will be explained in greater detail below on the basis of various examples.

Sample 1 describes a cement that is free of $C_3S$, but contains 20 wt. % $C_4A_3\bar{S}$.

Sample 2 describes a cement according to the present invention with 40 wt. % $C_3S$ and 30 wt. % $C_4A_3\bar{S}$.

Sample 3 pertains to a cement containing 80 wt. % $C_3S$ and 10 wt. % $C_4A_3\bar{S}$.

The percentages of the other clinker phases, the $SO_3$ content in the clinker, the calcining temperature selected, as well as the total $SO_3$ content in the cement are shown in the table below along with the compressive strength values measured after 1, 3, 7, 28, and 365 days.

The data show that the samples according to the present invention have a markedly improved initial strength, and that the further increase in strength also drastically exceeds in some cases that found in Reference Sample 1.

To illustrate the advantages that can be achieved with the portland cement according to the present invention, a conventional portland cement, which was calcined at 1,480° C., is also presented as Sample 4.

| No. | Clinker phases (wt. %) | | | | | $SO_3$ in clinker (wt. %) | Calcining temp. (°C.) | Total $SO_3$ (wt. %) | Compressive strength (N/mm²) | | | | |
|---|---|---|---|---|---|---|---|---|---|---|---|---|---|
| | $C_3S$ | $C_2S$ | $C_3A$ | $C_4A_3\bar{S}$ | $C_4AF$ | | | | 1 d | 3 d | 7 d | 28 d | 365 d |
| 1 | 0 | 60 | 0 | 20 | 20 | 7.5 | 1,200 | 7 | 21.0 | 27.0 | 29.0 | 32.5 | 77.5 |
| 2 | 40 | 0 | 0 | 30 | 30 | 5.9[1)] | 1,250 | 16 | 36.0 | 37.0 | 43.5 | 46.5 | 49.0 |
| 3 | 80 | 0 | 0 | 10 | 10 | 5.0[1)] | 1,270 | 3 | 34.5 | 59.5 | 77.0 | 86.0 | 102.0 |
| 4 | 80 | 0 | 10 | 0 | 10 | 0.0 | 1,480 | 2 | 21.5 | 49.5 | 72.5 | 81.5 | 85.0 |

[1)]0.5 wt. % $CaF_2$ was added to the raw material mixture of these samples.

Even though the portland cement described contains a much higher percentage of sulfate than a conventional portland cement, it develops no significant sulfate expansion. However, if desired, this expansion can be specifically adjusted by varying the actual $C_4A_3\bar{S}$ content.

The more $C_4A_3\bar{S}$ the clinker contains, and the more sulfate is added to the cement, the larger will be the amount of ettringite formed after mixing with water, and consequently the greater will be the expansion.

Correspondingly, portland cements according to the present invention, with $C_4A_3\bar{S}$ contents below 15 wt. %, exhibit practically no expansion, whereas an expanding cement can specifically be prepared by increasing the percentage of this clinker phase.

The formation of an increased amount of ettringite, which is due to the $C_4A_3\bar{S}$ phase, leads, conversely, to a cement whose initial strength exceeds that of an ordinary portland cement.

The reduced energy consumption made possible during the preparation of the clinker according to the present invention was pointed out above. Experiments have shown that the energy consumption decreases by up to 30%.

In addition, the lining of the calcining kiln (rotary tubular kiln) is subject to a lesser stress because of the lower calcining temperature. This also leads to a cost advantage.

Finally, less melt phase is formed during the calcination of clinker (which is also due to the low calcining temperature), which leads to the relatively porous clinker, and the clinker has, in turn, better grindability, so

I claim:

1. Portland cement clinker containing the following amounts of clinker phases in wt. %:
   $3CaO.SiO_2$ ($C_3S$): 30 to 80,
   $4CaO.3Al_2O_3.SO_3$ ($C_4A_3\bar{S}$): 5 to 30,
   $4CaO.Al_2O_3.Fe_2O_3$ ($C_4AF$): <30,
   $2CaO.SiO_2$ ($C_2S$): <40,
   $3CaO.Al_2O_3$ ($C_3A$): <20,
and an $SO_3$ content between 2 and 8 wt. %, obtained by calcining a raw material mixture containing CaO, $SiO_2$, $Al_2O_3$, and $Fe_2O_3$, together with an additive containing $SO_3$ and an additive containing fluoride ($F^-$), at temperatures between 1,150° C. and 1,350°]C.

2. Portland cement clinker in accordance with claim 1, containing the following amounts of clinker phases in wt. %:
   $C_3S$: 40 to 80,
   $C_4A_3\bar{S}$: 10 to 30,
   $C_4AF$: 10 to 30,
the remainder, if any, being $C_2S$ and $C_3A$.

3. Portland cement clinker in accordance with claim 1, wherein the sum of the amounts of the clinker phases $C_2S$ and $C_3A$ is less than 5 wt. %.

4. Portland cement clinker in accordance with claim 1, wherein the fluorine-containing additive is calcium fluoride ($CaF_2$), sodium fluoride ($NaF_2$), or calcium fluoride and sodium fluoride.

5. Portland cement clinker in accordance with claim 1, wherein the amount of fluorine ($F^-$) is 0.2 to 1.0 wt. % relative to the raw material mixture.

6. Portland cement clinker in accordance with claim 1, wherein the amount of fluorine ($F^-$) is 0.4 to 0.6 wt. % relative to the raw material mixture.

7. Portland cement clinker in accordance with claim 1, with an $SO_3$ content between 4 and 6 wt. % relative to the raw material mixture.

8. Portland cement clinker in accordance with claim 1, wherein the $SO_3$-containing additive is calcium sulfate.

9. Portland cement clinker in accordance with claim 1, wherein the $SO_3$-containing additive is gypsum, anhydrite, industrial residuals including ash from a fluidized-bed furnace or from flue gas desulfurization, or a mixture thereof.

10. Portland cement clinker in accordance with claim 1, with a specific surface of 2,500 to 4,000 $m^2/g$ (according to Blaine).

11. Portland cement comprising the portland cement clinker in accordance with claim 1 and an additional amount of $SO_3$, wherein the $SO_3$ content of said portland cement including the portland cement clinker is between 3 and 18 wt. %.

12. Portland cement in accordance with claim 11, in which the amount of $SO_3$ additionally present in the cement is present as gypsum, anhydrite, industrial residuals including ash from a fluidized-bed furnace or from flue gas desulfurization, or a mixture thereof.

13. Portland cement clinker containing the following amounts of clinker phases in wt. %:

$3CaO.SiO_2$ ($C_3S$): 40 to 80,
$4CaO.3Al_2O_3.SO_3$ ($C_4A_3\bar{S}$): 10 to 30,
$4CaO.Al_2O_3.Fe_2O_3$ ($C_4AF$): 10 to 30,
$2CaO.SiO_2$ ($C_2S$): <5, and
$3CaO.Al_2O_3$ ($C_3A$): <5, the clinker having an $SO_3$ content between 4 and 6 wt. %, obtained by calcining a raw material mixture containing CaO, $SiO_2$, $Al_2O_3$, and $Fe_2O_3$, together with an additive containing $SO_3$ and an additive containing fluorine ($F^-$), at temperatures between 1,150° C. and 1,350° C., wherein the sum of the amounts of the clinker phases $C_2S$ and $C_3A$ is less than 5 wt. %, wherein the fluorine-containing additive is calcium fluoride ($CaF_2$), sodium fluoride ($NaF_2$), or calcium fluoride and sodium fluoride, wherein the amount of fluorine ($F^-$) is 0.4 to 0.6 wt. % relative to the raw material mixture, wherein the $SO_3$-containing additive is calcium sulfate, from gypsum, anhydrite, industrial residuals, or a mixture thereof, and wherein the portland cement clinker has a specific surface of 2,500 to 4,000 $m^2/g$ (according to Blaine).

14. Portland cement based on a portland cement clinker in accordance with claim 13, wherein the $SO_3$ content of said portland cement including the portland cement clinker is between 3 and 18 wt. %.

* * * * *